(No Model.)  F. H. RICHARDS.  5 Sheets—Sheet 1.
WEIGHING MACHINE.

No. 589,300.  Patented Aug. 31, 1897.

Fig. 1.

Witnesses  
Chas. F. Schmelz  
Fred. J. Dole.

Inventor  
F. H. Richards.

(No Model.) 5 Sheets—Sheet 2.

F. H. RICHARDS.
WEIGHING MACHINE.

No. 589,300. Patented Aug. 31, 1897.

Witnesses
Chas. T. Schmelz
Fred. J. Dole.

Inventor
F. H. Richards (No Model.)  F. H. RICHARDS.  5 Sheets—Sheet 3.
WEIGHING MACHINE.

No. 589,300.　　　　　　　　Patented Aug. 31, 1897.

Witnesses　　　　　　　　　　　　Inventor
Chas. A. Schwartz　　　　　　　　F. H. Richards
Fred. J. Dole.

(No Model.)  F. H. RICHARDS.  5 Sheets—Sheet 4.
WEIGHING MACHINE.

No. 589,300.  Patented Aug. 31, 1897.

Fig. 4.

Witnesses
Chas. F. Schwulz
Fred. J. Dole.

Inventor
F. H. Richards.

(No Model.) 5 Sheets—Sheet 5.

F. H. RICHARDS.
WEIGHING MACHINE.

No. 589,300. Patented Aug. 31, 1897.

Witnesses
Chas. L. Schmelz
Fred. J. Dole.

Inventor
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,300, dated August 31, 1897.

Application filed March 22, 1897. Serial No. 628,616. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing predetermined quantities of material; and it has for its main object the provision of an improved machine of this class which may be thrown out of action automatically at the proper point in the operation of the machine after weighing a determined number of loads.

As one of the main features thereof this invention embodies a valve-actuator shiftable into and out of operative relation with the stream-controller or valve which governs the supply of material to the load-receiver or bucket of the weighing mechanism, and the throwing of the machine into or out of action is intended to be controlled by the shifting of this actuator into or out of its operative position.

As it is customary in automatic weighing-machines as at present operated to indicate by a register the number of loads weighed by the machine and as, as has been hereinbefore stated, it is intended that this improved weighing-machine shall be thrown out of action at a predetermined point in the operation thereof, it will be obvious that a register which will indicate the number of loads it is desired to weigh and the number of loads so weighed may be employed advantageously as the means for controlling the throwing of the machine out of operation when the desired number of loads of material have passed through such machine. Hence in the present case an indicator of the "stop-register" type is employed for controlling the shifting of the valve-actuator to its operative and inoperative positions, respectively, and these movements are preferably governed by driving means controlled electrically from the stop-register, the actuator and the driving means for shifting the same constituting electrically-controlled stopping means for stopping the operation of the weighing mechanism after the proper number of loads have been weighed.

In prior patents granted to me the means for actuating the stream-controller or valve to open the same is a thrust-rod operated from the beam mechanism and adapted to open the valve on the shutting of the closer, and as in this instance the throwing of the machine out of action is intended to be accomplished by preventing the opening of the valve on the shutting of the closer after the determined number of loads have passed through the machine the valve-opening thrust-rod constitutes a convenient means for controlling the opening of the valve and is therefore represented in the drawings of the present application as a member so organized relatively to the other parts of the weighing-machine that it may be shifted relatively to the valve into and out of operative relation therewith, so that, although in position to be actuated from the beam mechanism, it will be ineffective to open the valve when shifted to its inoperative position. This shifting movement should, as will be apparent, be controlled by the stop-register for indicating the number of loads that may have passed through the machine and the point at which the weighing action is to be stopped.

For the purpose of controlling the movement of the valve-opening member from its operative to its inoperative position, and vice versa, I prefer to employ, in connection with suitable driving means, a driven member which may operate said actuating member and reversing means for reversing the direction of movement of the driven member. This operation will be controlled, as will be evident, from the stop-register of the weighing mechanism, suitable devices for this purpose being included in or governed by one or more electric circuits controlled by the stop-register. The preferred means for governing the shifting of this valve-actuating member from one of its positions to the other will include a pair of oppositely-rotative driving members, a driven member operated thereby and which will thereupon shift the valve-actuating member, and an electrically-operated shifter for shifting the driven member into operative relation with the one or the other of such driving members, it being obvious that this driven member should be in a normal idle position when the weighing mechanism is operating automatically in the usual manner, and that when in such idle position the driven member will be ineffective to change the relation of any of the parts of the machine relatively to the others, and hence will not then interfere with the normal operation of the mechanism.

In the drawings accompanying and forming part of this specification, Fig. 2 is a side elevation of the same, showing the machine in position to weigh the material delivered thereto. Fig. 2ª is an end view of the stop-register, showing one position of a circuit-controlling switch carried thereby. Fig. 3 is a side elevation showing the positions of the parts at an intermediate point in the operation of throwing the machine out of action. Fig. 3ª is a view similar to Fig. 2ª, but showing the other position of the circuit-controlling switch thereof.

Similar characters designate like parts in all the figures of the drawings.

Any suitable framework may be employed for supporting the several parts of my improved weighing mechanism. That illustrated herein comprises a chambered supporting-base 3, from which rise the side frames 2 and 4, connected at their upper ends by a top beam 5, which supports the usual supply spout or hopper H for delivering material to the load-receiver or bucket of the machine. This bucket is designated in a general way by G and is pivotally supported on knife-edges 20, carried by the scale-beams of a pair of beam mechanisms, (designated by B and B', respectively,) the beam-arms of these mechanisms being in turn supported by knife-edge bearings 21, rising from the base 3 of the framework.

For the purpose of controlling the supply of material delivered to the bucket I prefer to employ a stream-supplying valve 70, having its axis of movement passing through the supply-stream flowing from the hopper H, this valve being preferably pivoted between a pair of arms 5', depending from the top beam 5 of the framework. This valve is intended to be closed by means of the usual counterweight 90.

The bucket G has an opening at the bottom thereof which is controlled in the usual manner by means of a closer (designated herein in a general way by L) and pivoted to the bucket at one side of the mouth thereof, so as to oscillate to open and close the discharge end of the bucket. This closer is counterweighted in the usual manner, as shown at 76, and has at its forward end a downwardly-projecting regulator-blade 77, adapted to retard the closing movement of the closer by engaging the material flowing out from the bucket and passing through the chambered supporting-base 3 of the weighing-machine.

It will be obvious, of course, that in the normal operation of the machine the opening movements of the valve and the closer should occur alternately, and hence I have provided, in connection with the parts hereinbefore described, reciprocally-effective means for limiting the opening movements of the valve and the closer in the manner shown and described in prior patents granted to me. At the upper side of the bucket are rock-arms 515 and 515', and connecting-rods 516 connect these rockers with the closer L in such a manner that when the closer is shut the connecting-rods and the rockers form toggles, which carry substantially all of the weight of the closer and the load supported thereby on the pivots of the rockers. The face of the rocker 515 is so shaped as to coöperate with the cam-arm 412, depending from the balance-weight of the valve 70, and it will be apparent that these members 515 and 412 constitute, respectively, valve-opening-movement and closer-opening-movement limiters for limiting the opening of the valve by the non-closing of the closer and the opening of the closer by the non-closing of the valve.

In order to actuate the valve 70 to open the same, I prefer, as before stated, to employ an actuator operable from the beam mechanism of the weighing-machine, and hence I have illustrated in the drawings of the present application the usual counterweighted lever 550, pivoted on the poising side of the beam mechanism B and constructed to form an actuator for opening the valve 70. For the purpose of transmitting the movements of this counterweighted lever to the valve for opening the latter I have heretofore usually employed a thrust-rod having its lower end in position to be actuated by the inner end of this lever and having its upper end pivotally connected with the valve. In the present case, however, while I make use of a thrust-rod operable by the counterweighted lever 550, such rod is not connected directly to the valve, but is so organized relatively thereto as to be shiftable into and out of operative relation therewith—that is to say, this thrust-rod constitutes a valve-actuating or stream-controller-actuating member shiftable relatively to the stream-controller or valve from an operative to an inoperative position, and vice versa, and will, when in its inoperative position, be ineffective for actuating the valve to open the same, even though the counterweighted lever 550 may operate in its usual manner. In the present construction this thrust-rod, which is designated herein by 558, is pivoted at its upper end to a lever 600, which has pivoted thereto, near the inner end thereof, a link 601, the upper end of which is pivoted to a rock-arm 602, fixed relatively to the valve in substantially the same manner in which the thrust-rod is usually connected with said rock-arm. The function of this lever 600 is to connect the link and the thrust-rod and to throw one of these members into and out of operative relation with the other, the member so actuated being in this case the thrust-rod, which, as will be obvious, will be movable longitudinally to its effective and ineffective positions, while being also shiftable in the usual manner transversely into and out of operative relation with the inner end of the valve-actuator 550, as in throwing said thrust-rod into position to discharge the load or to test the accuracy of the weighing mechanism.

Figure 1:
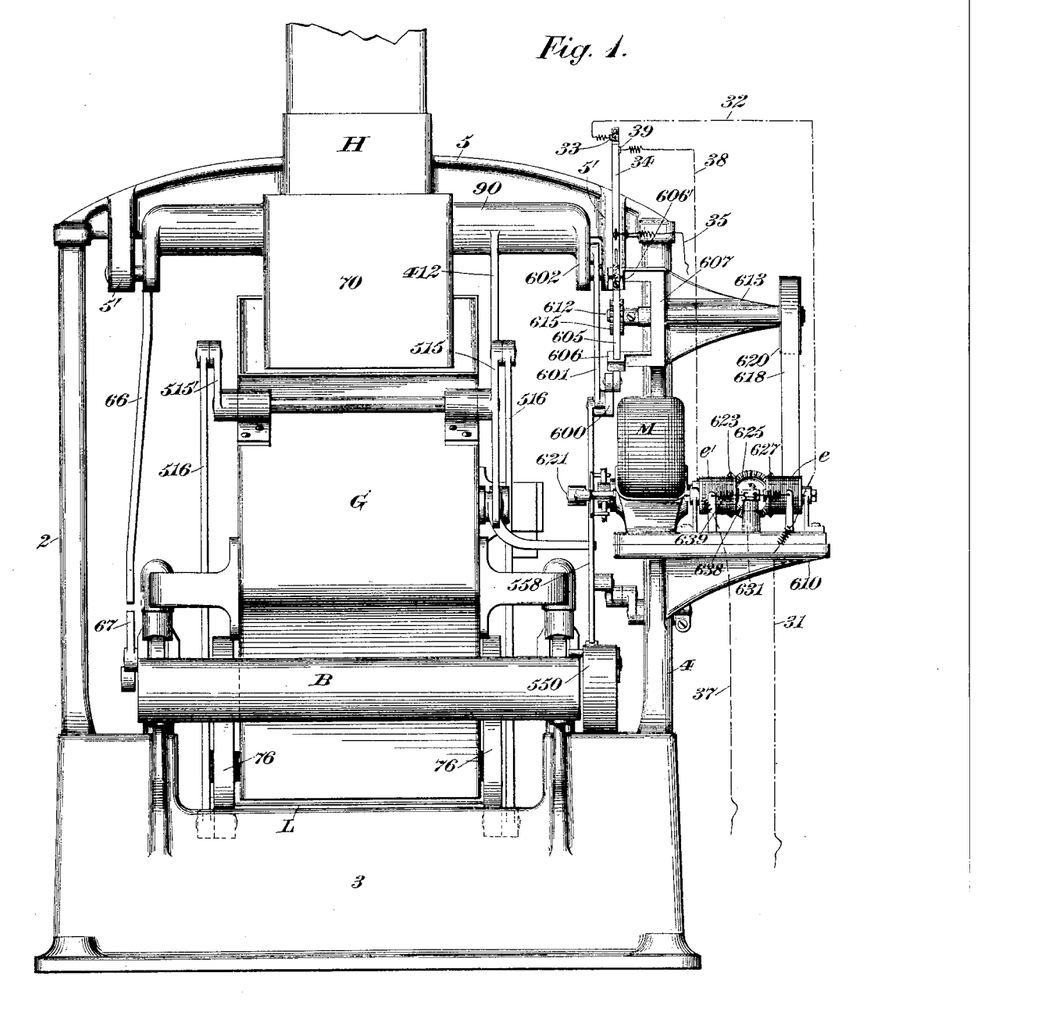
Figure 1 is a front elevation of a weighing-machine constructed in accordance with my present improvements.
Figure 5:
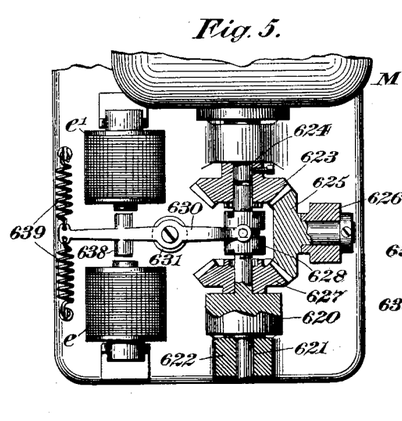
Fig. 5 is an enlarged detail sectional plan of the reversing mechanism for controlling the shifting of the valve-actuating member from one of its positions to the other, and vice versa.

One of the most important features of my present invention is, as before stated, to provide means for automatically throwing the steam-controller-actuating member, which in this case is the thrust-rod 558, to its operative and inoperative positions, respectively, and it will be apparent that the lever 600 constitutes a part of automatic actuating-member-shifting means for this purpose. At its outer end the lever 600 is pivotally connected to the lower end of a rack 605, supported for reciprocation in guides 606 and 606′ at the outer end of a bracket 607, projecting from the forward side of the side frame 4. The bracket 607 supports in this instance a shaft 612, mounted in a long bearing 613, projecting outward from the bracket, as shown in Fig. 1. At its inner end the shaft 612 has fixed thereto a pinion 615, the teeth of which engage the corresponding teeth of the rack 605 to reciprocate said rack from its upper to its lower position, and vice versa. At its outer end the shaft 612 preferably carries a band-wheel 616, which is driven by a belt 618, operated in this case from an electric motor, although it will be apparent that any other suitable form of power device might be employed for this purpose. This motor is designated in a general way by M and is supported on a shelf 610, projecting from the forward side of the framework. In the present case the driving-belt 618 is not carried directly by the armature-shaft of the motor, but instead is carried around a band-wheel 620, fixed on a short shaft 621, (see Fig. 5,) journaled at its outer end in a bearing 622, rising from the base of the motor and journaled at its inner end in the journal-opening of a bevel-gear 623, fixed on the outer end of the armature-shaft 624. The bevel-gear 623 meshes with a corresponding bevel-gear 625, carried by a stud journaled in a bearing 626, and the gear 625 in turn meshes with a third bevel-gear 627, disposed oppositely to the gear 623. The gear 627 is mounted loosely on the shaft 621 and will of course always rotate in one direction. For the purpose, however, of rotating the shaft 621 in either one or the other direction I have illustrated herein a shifter in the form of a coupling member 628, splined on the shaft 621, so as to rotate therewith, but slidable freely thereon, and having at its opposite ends lugs or projections adapted to engage the walls of corresponding sockets in the faces of the bevel-gears 623 and 627.

Figure 6:
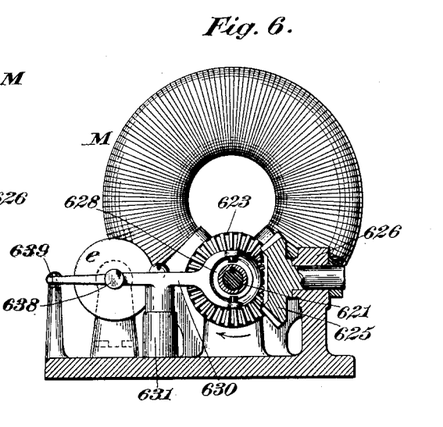
Fig. 6 is a sectional side elevation of the same.

In order to reciprocate the coupling member 628 on the shaft 621, I employ, in connection with said coupling member, a shifting lever 630, pivoted on a post 631 (see Figs. 5 and 6) for oscillation in a horizontal plane, this shifting lever having at its working end pins or fingers adapted to be received in the usual manner in a peripheral groove of the coupling member, to thereby operate the latter to carry it into engagement with the one or the other of the bevel-gears. It will be clear, by reference to Fig. 5, that when the coupling member is in its middle position the band-wheel or driven member 620 will not be rotated, but that when the coupling member is in engagement with the bevel-gear 627 said band-wheel will be rotated oppositely to the direction of its rotation when the coupling member is in engagement with the bevel-gear 623.

The devices which I have just described constitute reversing means for reversing the direction of rotation of the driven member, and hence for shifting the valve-actuating member or thrust-rod into and out of operative relation with the stream-controller or valve; and as it is necessary that this reversing means be automatic in its operation, at least for the purpose of throwing the machine out of action, I have provided in the present organization means for automatically controlling this reversing mechanism and for automatically reversing the last preceding movement of the driven member at any determined point in the operation of the weighing mechanism.

The operation of the reversing mechanism, and hence of the thrust-rod, is advantageously controlled electrically from a stop-register mechanism, which stop-register may be of the type shown and described in the patent granted to me October 29, 1895, No. 548,854, to which reference may be had for a detailed description of the operation of the register. The stop-register is illustrated at R in the drawings and is carried on the bucket and is operated from the closer, in the present case mechanically, by means of a connecting-rod 632.

Figure 7:
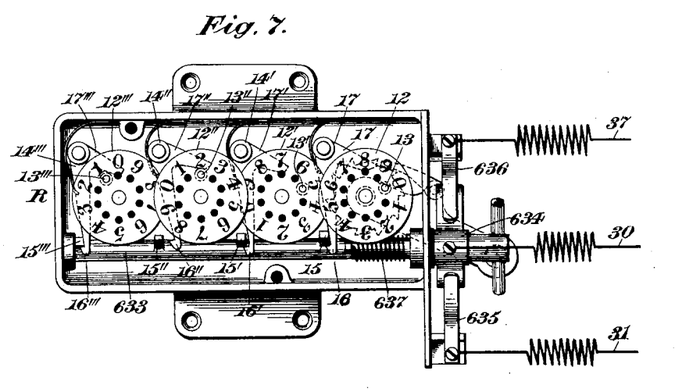
Fig. 7 is an enlarged detail side elevation illustrating the stop-register and the automatic switch connected therewith.
Figure 8:
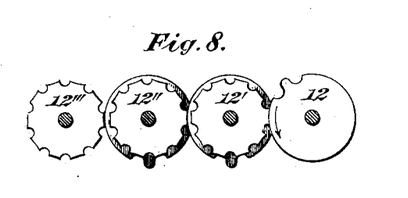
Fig. 8 is a detail of the mechanism of the stop-register.

The stop-register R (see Figs. 7 and 8) embodies a stop member adapted to be released at a determined point in the operation of the machine and after a predetermined number of loads have been weighed out by the mechanism.

Figures 2, 2A:
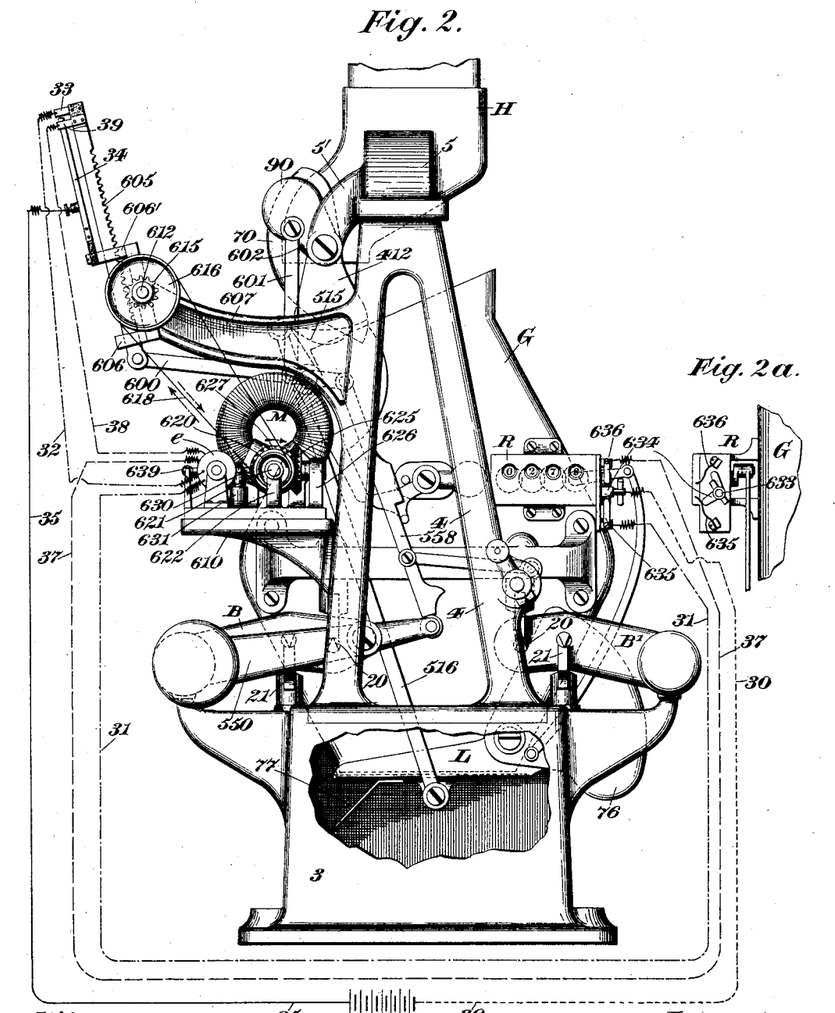

The register-wheels are indicated by 12, 12′, 12″, and 12‴ and are supported and connected in the usual manner. Each of these wheels has a circuit of ten openings, into any one of which a pin 13, 13′, 13″, and 13‴ may be inserted to control the release of the stop member. These pins are intended to actuate, at the proper points in the movement of the register-wheels, angle-levers, such as 14, 14', 14'', and 14''', respectively, normally spring-pressed into engagement with corresponding stops 15, 15', 15'', and 15''', carried by the stop member and having latches 16, 16', 16'', and 16''' for engaging said stops. The wheel 12 is the driving-wheel of the train, and it will be clear that as these wheels are rotated the pins 13, 13', 13'', and 13''' will engage the arms 17, 17', 17'', and 17''' of the angle-levers and release the latches from the stops at the points corresponding to the indications shown by the setting of the pins. The stop member is in this case a shaft, such as 633, and this shaft may carry at its outer end an electric switch 634, controlling an electric circuit, which circuit in turn controls the actuator-shifting means for shifting the valve-actuator or thrust-rod 558. This switch 634 is adapted to make contact with either one of the two terminals 635 and 636, and normally is held by the shaft 633 in contact with the terminal 635, but said switch is also so organized with respect to the stop-register as to be thrown by a spring 637 or its equivalent into contact with the terminal 636 when the shaft 633 is released at the end of the determined period of operation. This switch is included in a circuit from any suitable source of power, as a battery b, from which passes a conductor 30 to the switch 634 on the stop-register, the return-circuit being from said switch through the conductor 31 to the electromagnet e, through the conductor 32 to a contact 33, carried by the rack 605. At this point when the weighing mechanism is operating normally, as shown in Fig. 2, the circuit is broken, but if the circuit were complete the current would pass by way of the contact-strip 34, through conductor 35, back to the battery. When the switch is released by the rock-shaft 633 of the stop-register, the spring 637 immediately causes the switch to break the contact with the terminal 635 and to make the contact with the opposite terminal 636, whereupon a circuit from the battery through the wire 30 is completed by the passage of the current from the switch 634 to the terminal 636, to conductor 37, to the electromagnet e', and through the conductor 38, contact 39, contact-strip 34, and the conductor 35, back to the battery.

The shifter 630, (see Figs. 5 and 6,) controlling the direction of rotation of the driven member or band-wheel 620 of the reversing mechanism, is operated in the present case by means of a duplex armature, which is designated by 638, and may be formed integral with the shifter and will normally lie in a central position between the pole-pieces of a pair of electromagnets e and e', supported on the base of the motor M. For the purpose of holding this armature in its normal middle or idle position springs, such as 639, are connected therewith and with said base.

Figures 3, 3A:
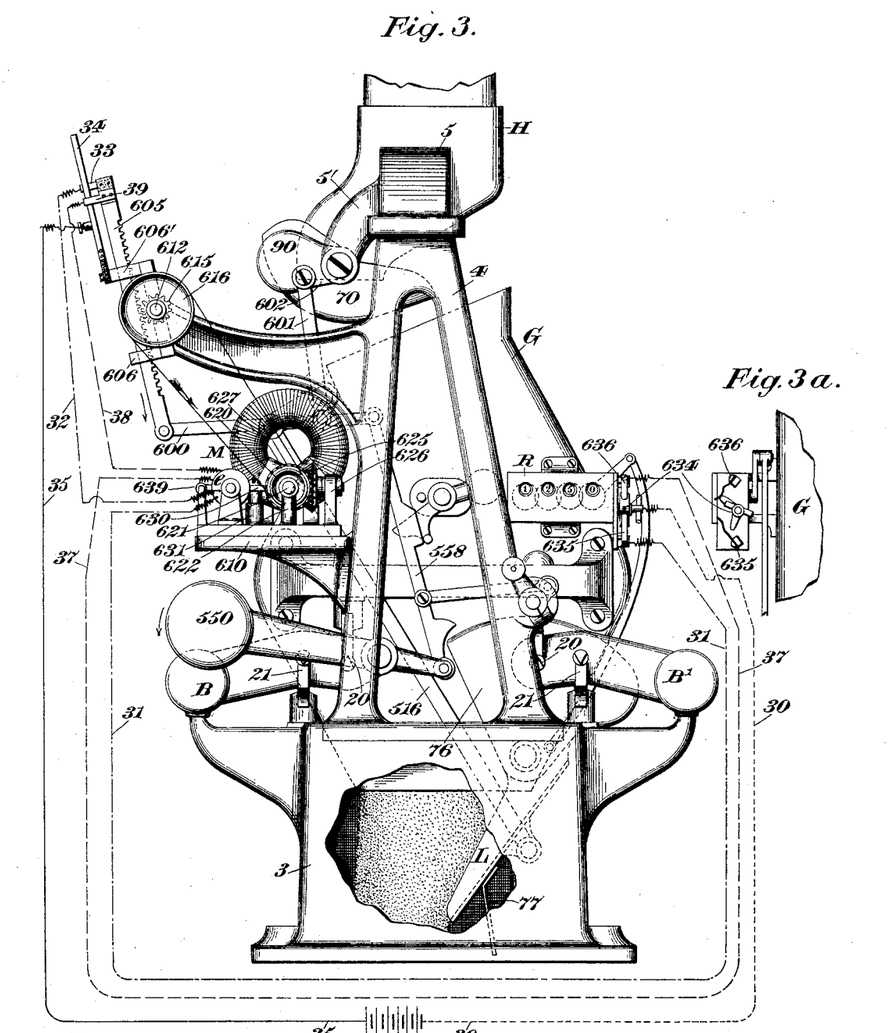
Figure 4:
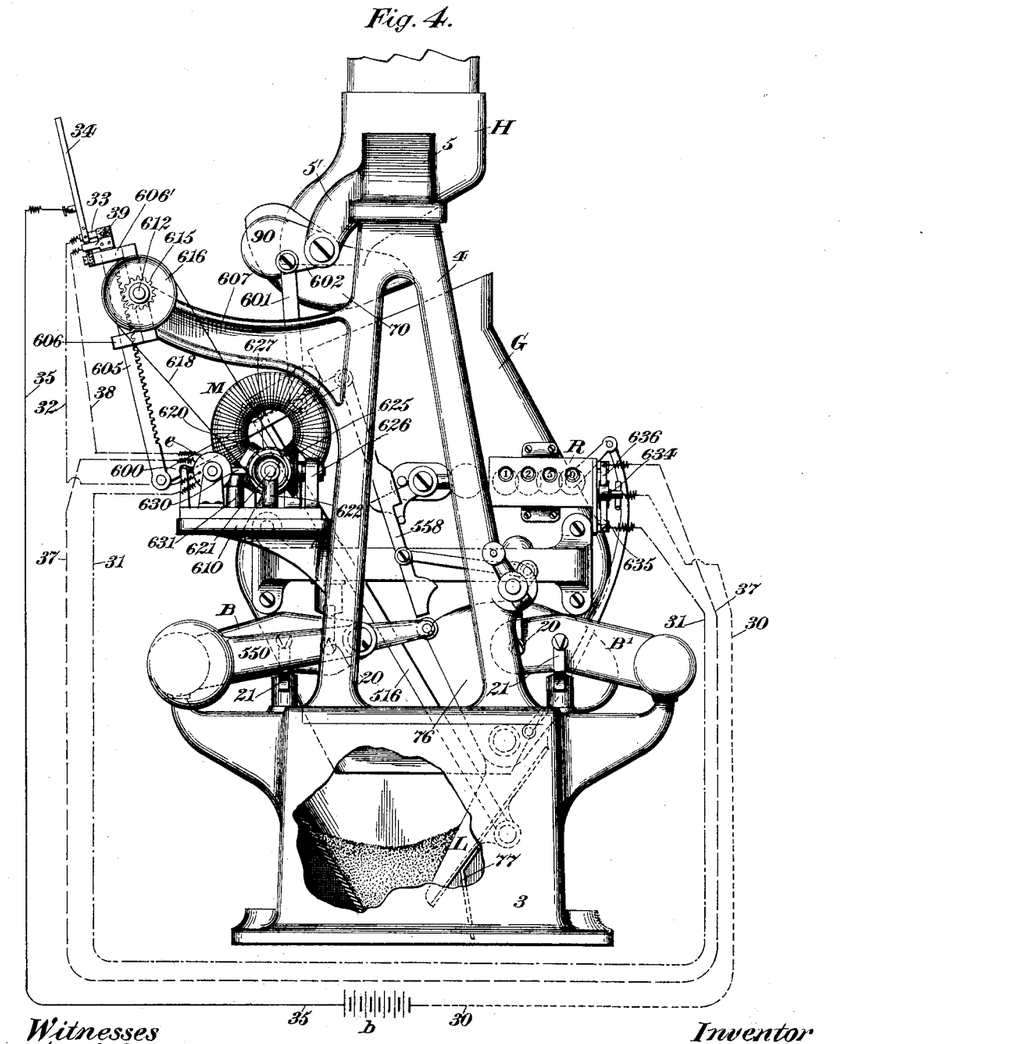
Fig. 4 is a side elevation showing the machine thrown out of action.

It will be obvious now that on the energization of the electromagnet e' by the passage of the current therethrough, as just described, the armature 638 will be drawn toward said electromagnet and the shifter will carry the coupling member 628 into engagement with the bevel-gear 627, which, being then coupled fast to the shaft 621, will cause the band-wheel 620 to rotate in the direction indicated by the arrow in Fig. 3, whereupon the driving connections between said gears and the rack 605 will carry said rack down from the position shown in Fig. 2, past that represented in Fig. 3, to that illustrated in Fig. 4, and cause said rack and the lever 600 to raise the thrust-rod 558 and throw the same out of operative relation with the valve—that is to say, before the valve 70 shall have had a chance to open the thrust-rod will have been carried into the position which it would normally assume after being operated by the counter-weighted lever 550 to open the valve. This will be obvious by reference to Fig. 4. Just before the rack reaches the limit of its downward movement the contact 39 is carried off from the lower end of the contact-strip 34, whereupon the circuit is broken and the shifter 630 is returned by the springs 639 to its normal idle or middle position by the deenergization of the electromagnet e', thus causing the uncoupling of the bevel-gear 627 and the coupling member 628, and consequently the stoppage of the rotation of the band-wheel 620.

It will be noticed that the contact 39 constitutes an automatic circuit-breaker controlled by the movements of the rack, and, as will hereinafter appear, the contact 33 is a similar automatic circuit-breaker operative for stopping the upward movement of the rack when the machine is thrown into action again. Hence it will be evident that I employ automatic circuit-breaking means for breaking alternately a pair of circuits controlling the movements of suitable shifting means for throwing a valve-actuator into and out of its effective position. While of course each of the contacts 33 and 39 is operative for making the circuit, as well as for breaking it, as is also the switch 634, yet it will be clear from the foregoing description of the operation of these parts that the switch 634 constitutes a circuit-maker and is not in all of its operations entirely automatic in character, while the contacts 33 and 39 are circuit-breakers and both are automatic in their action. Moreover, while each circuit-breaker controls the operation of the actuator-shifting means, yet each in turn is controlled by such means and is movable therewith.

After the machine has been thrown out of action and the parts are in the positions represented in Fig. 4 it will be clear that there can be no further action of the machine until the parts are returned to the positions illustrated in Fig. 2. As the operation of the circuit controlling the electromagnet is dependent, however, in this case entirely upon the stop-register it is necessary to reset the register for another indication or series of indications and to restore the switch 634 to the position shown in Fig. 2ª before the machine can begin to operate again. On the resetting of the switch 634 from the position shown in Fig. 3ª to that indicated in Fig. 2ª a circuit will be closed (see Fig. 4) from the battery $b$ through the conductor 30, switch 634, conductor 31, electromagnet $e$, conductor 32, contact 33, contact-strip 34, and the contact 35, whereupon the electromagnet $e$ is energized, the shifter 630 throws the coupling member 628 into engagement with the bevel-gear 623, and the band-wheel 620 is rotated in the direction shown by the arrow in Fig. 2 and carries the rack 605 up to the position shown in said figure. Just before the rack arrives at the limit of its upward movement the contact 33 is carried off from the contact-strip 34, the circuit is broken, and the armature 638 and the shifter 630 return to their normal middle positions and withdraw the coupling member 628 from engagement with the bevel-gear 623, thus stopping the rotation of the band-wheel 620.

It will be noticed that at the end of each movement of the reciprocatory rack or actuator-shifter, whether up or down, when either contact 33 or 39 is carried off from the contact-strip 34 the other one of said contacts is left on said contact-strip in position to close the opposite circuit when the switch 634 is set to start the machine or is tripped by the stop-register automatically at the end of a series of weighing operations.

As the operation of all of the novel features of my invention has been clearly set forth, a further description of the action of the several details not herein particularly described will be omitted, as these details are well known in the art.

The valve 70 will preferably be held in the usual manner during the drip period by means of a drip-lever 66, depending from the valve and adapted to be engaged by a by-pass stop 67 on the beam mechanism, (see Fig. 1,) this drip-lever being released on the descent of the beam mechanism below the poising-line.

It will be evident that by means of my present improvements I am enabled to control the operation of an automatic weighing-machine in such a manner that the machine may be stopped, after any desired number of loads have been weighed, and thrown out of action, so that it will be impossible to start the machine until the controlling mechanism therefor is reset, all of these operations being governed by electrical devices which prevent interference with the predetermined action of the weighing mechanism.

Having described my invention, I claim—

1. The combination, with weighing mechanism embodying beam mechanism, of a stream-controller; carrying means independent of the beam mechanism; and a stream-controller-actuating member supported by said carrying means and shiftable bodily toward and from the stream-controller from an operative to an inoperative position, and vice versa.

2. The combination, in weighing mechanism, of a stream-controller; a stream-controller actuator; and a power-transmitting member between said stream-controller and the stream-controller actuator and shiftable bodily toward and from the stream-controller from an operative to an inoperative position and also shiftable into and out of operative relation with the stream-controller actuator.

3. The combination, in weighing mechanism, of a valve; a valve-actuator; and a valve-actuating thrust-rod connected with the valve and shiftable bodily toward and from the valve from an operative to an inoperative position and having its lower end normally in position to be operated by said valve-actuator.

4. The combination, in weighing mechanism, of a valve; a valve-actuator; and a valve-actuating thrust-rod shiftable bodily toward and from the valve from an operative to an inoperative position and also shiftable into and out of operative relation with the valve-actuator.

5. The combination, in weighing mechanism, of a valve; a valve-actuator; and a valve-actuating thrust-rod bodily shiftable longitudinally toward and from the valve from an operative to an inoperative position and also shiftable transversely into and out of operative relation with the valve-actuator.

6. The combination, in weighing mechanism, of a valve; a valve-actuating member; a link connected with the valve; and connecting means between and joining the valve-actuating member and the link, for throwing one of said members into and out of operative relation with the other.

7. The combination, in weighing mechanism, of a valve; a valve-actuator; a valve-actuating thrust-rod; a thrust-rod-shifting rack operative for shifting the thrust-rod bodily toward and from the valve from an operative to an inoperative position; and means for operating the rack.

8. The combination, in weighing mechanism, of a stream-controller; a stream-controller-actuating member shiftable bodily toward and from the stream-controller from an operative to an inoperative position; a load-receiver; beam mechanism; and actuator-shifting means operative on the weighing of a determined number of loads.

9. The combination, with weighing mechanism, of a stream-controller; a load-receiver; beam mechanism; a stop-register; a stream-controller-actuating member shiftable bodily toward and from the stream-controller from an operative to an inoperative position; and actuator-shifting means controlled by the stop-register and operative on the weighing of a determined number of loads.

10. The combination, in weighing mechanism, of a stream-controller; a stream-controller-actuating member shiftable bodily toward and from the stream-controller from an operative to an inoperative position; a switch operative at a predetermined point in the operation of the machine; an electric circuit controlled by said switch; and actuating-member-shifting means controlled by said circuit.

11. The combination, in weighing mechanism, of a stream-controller; a stream-controller-actuating member shiftable bodily toward and from the stream-controller from an operative to an inoperative position; an automatic switch operative at a determined point in the operation of the machine; an electric circuit controlled by said switch; and actuating-member-shifting means controlled by said circuit.

12. The combination, in weighing mechanism, of a stream-controller; a stream-controller-actuating member shiftable bodily toward and from the stream-controller from an operative to an inoperative position; an electric circuit; a circuit-maker operative for closing said circuit at a determined point in the operation of the machine; and actuating-member-shifting means controlled by said circuit.

13. The combination, in weighing mechanism, of a stream-controller; a stream-controller-actuating member shiftable bodily toward and from the stream-controller from an operative to an inoperative position; a load-receiver; beam mechanism; a stop-register; an automatic switch controlled by said register; an electric circuit controlled by said switch; and actuating-member-shifting means controlled by said circuit.

14. The combination, in weighing mechanism, of a stream-controller; a stream-controller-actuating member shiftable bodily toward and from the stream-controller from an operative to an inoperative position; an electric circuit; a circuit-maker for closing said circuit at a determined point in the operation of the machine; actuating-member-shifting means controlled by said circuit; and an automatic circuit-breaker for breaking said circuit.

15. The combination, in weighing mechanism, of a stream-controller; a stream-controller-actuating member shiftable bodily toward and from the stream-controller from an operative to an inoperative position; an electric circuit; a circuit-maker operative for closing said circuit at a determined point in the operation of the machine; actuating-member-shifting means controlled by said circuit; and a circuit-breaker controlling said circuit and controlled by said actuating-member-shifting means.

16. The combination, in weighing mechanism, of a stream-controller; a stream-controller-actuating member shiftable bodily toward and from the stream-controller from an operative to an inoperative position; an electric circuit; actuating-member-shifting means controlled by said circuit; and an automatic circuit-breaker for breaking said circuit.

17. The combination, in weighing mechanism, of a stream-controller; a stream-controller-actuating member shiftable bodily toward and from the stream-controller from an operative to an inoperative position; a pair of electric circuits; actuating-member-shifting means controlled by said circuits; and automatic circuit-breaking means for breaking said respective circuits alternately when the actuating member is in its operative and inoperative positions, respectively.

18. The combination, in weighing mechanism, of a stream-controller; a stream-controller-actuating member shiftable bodily toward and from the stream-controller from an operative to an inoperative position; a pair of electric circuits; actuating-member-shifting means controlled by said circuits; circuit-making means for closing said circuits alternately to permit the shifting of the actuating member toward and from its operative position; and automatic circuit-breaking means for breaking said respective circuits alternately when the actuating member is in its operative and inoperative positions, respectively.

19. The combination, in weighing mechanism, of a stream-controller; a stream-controller-actuating member shiftable bodily toward and from the stream-controller from an operative to an inoperative position; a pair of electric circuits; actuating-member-shifting means controlled by said circuits; circuit-making means for closing said circuits and for automatically closing one of said circuits at a determined point in the operation of the machine; and automatic circuit-breaking means for breaking said respective circuits alternately when the actuating member is in its operative and inoperative positions, respectively.

20. The combination, in weighing mechanism, of a stream-controller; a stream-controller-actuating member shiftable bodily toward and from the stream-controller from an operative to an inoperative position; an electric circuit; actuating-member-shifting means controlled by said circuit; and an automatic circuit-breaker movable with said actuating-member-shifting means.

21. The combination, in weighing mechanism, of a stream-controller; a stream-controller-actuating member shiftable bodily toward and from the stream-controller from an operative to an inoperative position; an electric circuit; actuating-member-shifting means controlled by said circuit; and an automatic circuit-breaker carried by said actuating-member-shifting means.

22. The combination, in weighing mechanism, of a stream-controller; a stream-controller-actuating member shiftable bodily toward and from the stream-controller from an operative to an inoperative position; an electric circuit; a contact-strip in said circuit; a reciprocatory actuating-member shifter controlled by said circuit; and an automatic circuit-breaker carried by said actuating-member shifter and slidable onto and off from said contact-strip.

23. The combination, in weighing mechanism, of a stream-controller; a stream-controller-actuating member shiftable bodily toward and from the stream-controller from an operative to an inoperative position; a pair of electric circuits controlling the respective movements of the actuating-member shifter; a contact-strip common to said circuits; a reciprocatory actuating-member shifter controlled by said circuits; and a pair of automatic circuit-breakers carried by said actuating-member shifter and slidable onto and off from said contact-strip.

24. In an automatic weighing-machine, the combination, with normally idle power-driven stopping mechanism for stopping the operation of the weighing mechanism, of an electric circuit controlling the operation of said stopping mechanism; and an automatic electric circuit-controller operative at the end of a predetermined period to cause the starting of said stopping mechanism in operation.

25. The combination, in weighing mechanism, of a pair of oppositely-rotative driving members; a valve; a valve-controlling driven member operative by said driving members, respectively; an electric circuit; a stop-register; an automatic circuit-controller for said circuit and controlled by the stop-register; and a shifter controlled by said circuit and operative, at a determined point in the operation of the weighing mechanism, for shifting said driven member.

26. The combination, in weighing mechanism, of a pair of oppositely-rotative driving members; a valve; a rotatable valve-controlling driven member; a coupling member slidable on said driven member and rotatable therewith and operative by said driving members, respectively; an electric circuit; a stop-register; an automatic circuit-controller for said circuit and controlled by the stop-register; and an automatic coupling-member shifter controlled by said circuit.

27. The combination, in weighing mechanism, of a pair of oppositely-rotative driving members; a valve; a valve-controlling driven member operative by said driving members, respectively; a pair of electric circuits; a stop-register; an automatic circuit-controller for said circuits and controlled by the stop-register; and an electromagnetically-operated shifter normally in an idle position and controlled by said respective circuits and operative, at determined points in the operation of the weighing mechanism, for shifting said driven member into operative relation with said driving members, respectively.

FRANCIS H. RICHARDS.

Witnesses:
  F. N. CHASE,
  ANDREW FERGUSON.